United States Patent
Mueller (10) Patent No.: US 10,595,191 B1
(45) Date of Patent: Mar. 17, 2020

(54) MOBILITY MANAGEMENT ENHANCER

(71) Applicant: AT&T INTELLECTUAL PROPERTY I, L.P., Atlanta, GA (US)

(72) Inventor: Julius Mueller, East Palo Alto, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/211,532

(22) Filed: Dec. 6, 2018

(51) Int. Cl.
*H04W 8/14* (2009.01)
*H04W 76/15* (2018.01)
*H04W 24/10* (2009.01)
*H04W 28/20* (2009.01)
*H04W 36/00* (2009.01)
(Continued)

(52) U.S. Cl.
CPC ............ *H04W 8/14* (2013.01); *H04W 16/26* (2013.01); *H04W 24/02* (2013.01); *H04W 24/10* (2013.01); *H04W 28/16* (2013.01); *H04W 28/20* (2013.01); *H04W 36/0027* (2013.01);
(Continued)

(58) Field of Classification Search
CPC ....... H04W 8/14; H04W 76/15; H04W 36/00; H04W 28/20; H04W 24/10; H04W 8/26; H04W 80/04; H04W 80/06; H04W 8/08; H04W 8/18; H04W 64/00; H04W 64/003; H04W 80/00; H04W 80/02; H04W 88/00; H04W 88/02; H04W 88/16; H04W 88/18; H04W 28/12; H04W 28/16; H04W 28/18; H04W 28/00; H04W 24/02; H04W 36/32; H04W 36/0027; H04W 72/04; H04W 88/08; H04W 28/0226; H04W 24/00; H04W 76/00; H04W 76/10; H04W 76/11; H04W 8/02; H04W 8/065; H04W 8/12; H04W 16/24; H04W 16/26; H04L 12/5691; H04L 12/5692; H04L 29/0619; H04L 29/06197; H04L 29/08585; H04L 29/08594

See application file for complete search history.

(56) References Cited

U.S. PATENT DOCUMENTS 5,996,662 A 10/1999 Murto
6,181,935 B1 * 1/2001 Gossman et al. ............ 455/433
(Continued)

FOREIGN PATENT DOCUMENTS

EP 1212680 A2 6/2002
WO 2017038100 A1 3/2017
(Continued)

*Primary Examiner* — Meless N Zewdu
(74) *Attorney, Agent, or Firm* — Baker Botts, LLP (57) ABSTRACT

In one embodiment, a method includes receiving, by a mobility management enhancer, device information from a device and determining, by the mobility management enhancer, a data session requested by the device based on the device information. The method also includes receiving, by the mobility management enhancer, service provider information from a service provider, requesting, by the mobility management enhancer, network information of a network, and receiving, by the mobility management enhancer, the network information. The method further includes determining, by the mobility management enhancer, an action associated with the data session requested by the device based on the device information, the service provider information, and the network information.

20 Claims, 4 Drawing Sheets

(51) Int. Cl.
  *H04W 16/26*  (2009.01)
  *H04W 24/02*  (2009.01)
  *H04W 28/16*  (2009.01)
  *H04W 36/32*  (2009.01)
  *H04W 64/00*  (2009.01)
(52) U.S. Cl.
  CPC ........... *H04W 36/32* (2013.01); *H04W 64/00* (2013.01); *H04W 76/15* (2018.02)

(56) References Cited

U.S. PATENT DOCUMENTS

| | | | |
|---|---|---|---|
| 6,728,748 | B1 | 4/2004 | Mangipudi et al. |
| 7,546,601 | B2 | 6/2009 | Byrd et al. |
| 8,065,680 | B2 | 11/2011 | Parvathaneni et al. |
| 8,503,336 | B2 | 8/2013 | Rappaport et al. |
| 8,510,740 | B2 | 8/2013 | Salsbery et al. |
| 9,072,039 | B2 | 6/2015 | Hu et al. |
| 9,178,766 | B2 | 11/2015 | Kramer et al. |
| 9,241,277 | B2 | 1/2016 | Kozisek et al. |
| 9,253,661 | B2 | 2/2016 | Bugenhagen |
| 9,680,918 | B2 | 6/2017 | Kish |
| 9,794,847 | B2 | 10/2017 | Ho et al. |
| 9,867,083 | B2 | 1/2018 | Liu et al. |
| 9,882,824 | B2 | 1/2018 | Maes et al. |
| 10,097,345 | B2 | 10/2018 | Agrawal et al. |
| 10,299,128 | B1 * | 5/2019 | Suthar et al. ......... H04W 12/06 |
| 2004/0162105 | A1 * | 8/2004 | Reddy et al. ................. 455/551 |
| 2005/0198277 | A1 * | 9/2005 | Wada et al. ................... 709/224 |
| 2010/0144365 | A1 | 6/2010 | Pan et al. |
| 2011/0078321 | A1 * | 3/2011 | Muret et al. .................. 709/228 |
| 2011/0235595 | A1 * | 9/2011 | Mehta et al. ................. 370/329 |
| 2013/0044724 | A1 * | 2/2013 | Lim et al. ..................... 370/329 |
| 2014/0044039 | A1 * | 2/2014 | Berg et al. ............ H04W 40/36 |
| 2014/0045486 | A1 * | 2/2014 | Berg et al. ................. 455/422.1 |
| 2014/0050199 | A1 * | 2/2014 | Chen et al. ....... H04W 36/0022 |
| 2014/0098680 | A1 * | 4/2014 | Anthony, Jr. et al. ........ 370/252 |
| 2014/0098687 | A1 * | 4/2014 | Anthony, Jr. et al. ...... H04W 36/023 |
| 2015/0281966 | A1 * | 10/2015 | Griot et al. ........... H04W 12/08 |
| 2016/0050587 | A1 | 2/2016 | Lam et al. |
| 2016/0066175 | A1 * | 3/2016 | Wang et al. ............. H04W 8/02 |
| 2017/0064591 | A1 | 3/2017 | Padfield et al. |
| 2017/0181027 | A1 | 6/2017 | Raleigh et al. |
| 2017/0302751 | A1 * | 10/2017 | Yang et al. ............. H04L 67/28 |
| 2018/0183855 | A1 | 6/2018 | Sabella et al. |
| 2018/0332636 | A1 * | 11/2018 | Lu et al. ................. H04W 76/10 |
| 2019/0053034 | A1 * | 2/2019 | Kim et al. ............. H04W 8/08 |
| 2019/0109768 | A1 * | 4/2019 | Senarath et al. .... H04L 41/0896 |
| 2019/0124671 | A1 * | 4/2019 | Starsinic et al. .. H04W 72/1205 |
| 2019/0159107 | A1 * | 5/2019 | Kim et al. ............ H04W 48/04 |

FOREIGN PATENT DOCUMENTS

| | | |
|---|---|---|
| WO | 2017080596 A1 | 5/2017 |
| WO | 2017176329 A1 | 10/2017 |
| WO | 2018031070 A1 | 2/2018 |

\* cited by examiner

MOBILITY MANAGEMENT ENHANCER

TECHNICAL FIELD

This disclosure generally relates to mobility management, and more specifically to a mobility management enhancer.

BACKGROUND

Networks are becoming denser and more heterogeneous. Small cells are deployed to densify the network, and antenna arrays will be deployed for 5G cellular applications. Multi-Access-Edge-Computing (MEC) will be deployed in addition to the existing cellular networks for ultra-low latency applications supported by the network. Certain industry standards, such as the $3^{rd}$ Generation Partnership Project (3GPP), specify using signal strength as a single measurement to assign devices to network base stations.

SUMMARY

According to an embodiment, a method includes receiving, by a mobility management enhancer, device information from a device and determining, by the mobility management enhancer, a data session requested by the device based on the device information. The method also includes receiving, by the mobility management enhancer, service provider information from a service provider, requesting, by the mobility management enhancer, network information of a network, and receiving, by the mobility management enhancer, the network information. The method further includes determining, by the mobility management enhancer, an action associated with the data session requested by the device based on the device information, the service provider information, and the network information.

According to another embodiment, a system includes one or more processors and a memory storing instructions that, when executed by the one or more processors, cause the one or more processors to perform operations including receiving, by a mobility management enhancer, device information from a device and determining, by the mobility management enhancer, a data session requested by the device based on the device information. The operations also include receiving, by the mobility management enhancer, service provider information from a service provider, requesting, by the mobility management enhancer, network information of a network, and receiving, by the mobility management enhancer, the network information. The operations further include determining, by the mobility management enhancer, an action associated with the data session requested by the device based on the device information, the service provider information, and the network information.

According to yet another embodiment, one or more computer-readable storage media embody instructions that, when executed by a processor, cause the processor to perform operations including receiving, by a mobility management enhancer, device information from a device and determining, by the mobility management enhancer, a data session requested by the device based on the device information. The method also includes receiving, by the mobility management enhancer, service provider information from a service provider, requesting, by the mobility management enhancer, network information of a network, and receiving, by the mobility management enhancer, the network information. The method further includes determining, by the mobility management enhancer, an action associated with the data session requested by the device based on the device information, the service provider information, and the network information.

Technical advantages of this disclosure may include one or more of the following. The mobility management enhancer manages the association of devices to network nodes through load balancing, which allows for a higher level of throughput with the same amount of spectrum. The mobility management enhancer enables a service provider with a limited amount of available spectrum to operate spectrum more efficiently by improving the quality of the user experience without increasing cost. The mobility management enhancer may perform one or more operations (e.g., increasing the bit rate, resolution, or frame rate of a data session) to improve the quality of the data stream transmitted to the device without changing the spectrum. The mobility management enhancer may enable network or user mobility related actions, carrier aggregation, and/or License Assisted Access (LAA). The mobility management enhancer may perform one or more operations that reduce transport cost per bit, which may save resources and lower operational costs. The mobility management enhancer may perform one or more handover actions such as moving an MEC demanding device from a macro cell to a micro cell to improve performance or moving a non-MEC service from a micro cell to a macro cell to free up expensive, limited MEC resources.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Wireless spectrum represents the various frequency bands used in wireless communication. Because spectrum is limited, it needs to be managed efficiently. The spectrum on different frequencies has different physical characteristics such as throughput, latency, range, and signal power. To accomplish this, spectrum may be distributed based on its unique physical characteristics. This disclosure describes a mobility management enhancer that allocates wireless spectrum by providing a control logic for client mobility based on mobile network operator (MNO) policies and machine learning algorithms.

Application data traffic is diversifying based on application layer requirements such as latency, bandwidth, and reliable transport. 3GPP uses Access Network Discovery and Selection Function (ANDSF). To assist mobile devices in identifying offload network destinations, ANDSF is based on a signaling strength load-balancing mechanism that does not support application level requirements. Currently, subscribers have a fixed upper limit of bandwidth for mobile connectivity. While the available bandwidth may be sufficient for executing certain services, overload situations may occur in the network when the request for data exceeds the capabilities of the network.

Bandwidth utilization is situation dependent and different for every communication link and user profile. This disclosure provides systems and methods to distribute unused bandwidth resources among adjacent networks. A prioritization mechanism differentiates between guaranteed resources for local traffic of a user (e.g., a subscriber of a service provider) and best-effort resources for visiting traffic of roaming and adjacent users (e.g., non-subscribers of the service provider). Small cells (e.g., cells connected to edge clouds) have less processing capabilities, less storage, shorter signal range, and different networking performance (e.g., lower latency and jitter) than large macro network cells (e.g., cells connected to a core network and large data centers). To maximize network resource efficiency and/or the quality of the data stream transmitted to the device, a mobility management enhancer is provided that actively influences the mapping of devices per cell. Unlike ANDSF and/or current 3GPP mobility policies such as signal-strength based associations between devices and cells, the mobility management enhancer does not use signal strength as a single measurement to assign devices to network nodes but rather considers a broad spectrum of information received from the device, the network, and the service provider.

Figure 1:
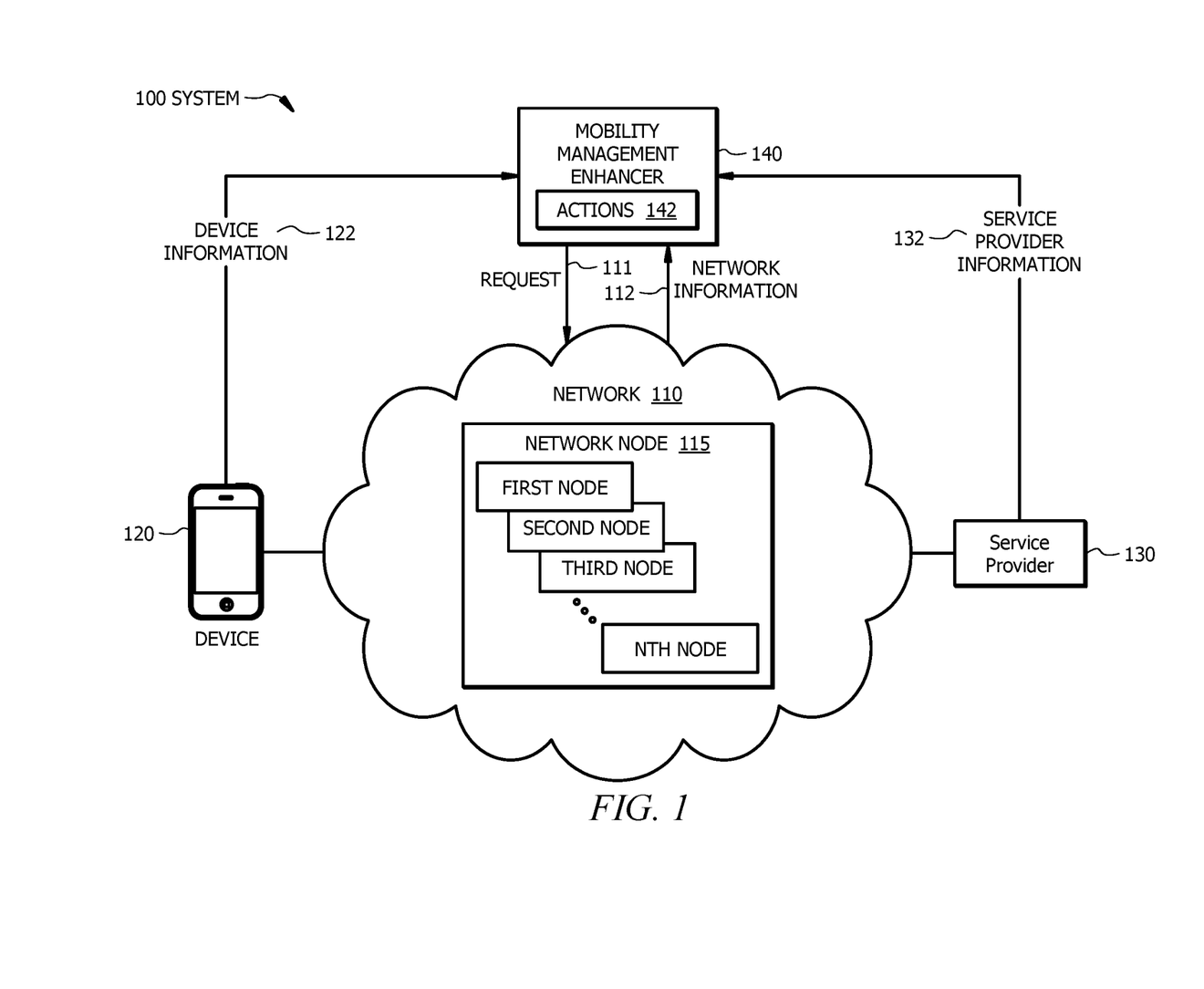
FIG. 1 illustrates an example system for mobility management.
Figure 2:
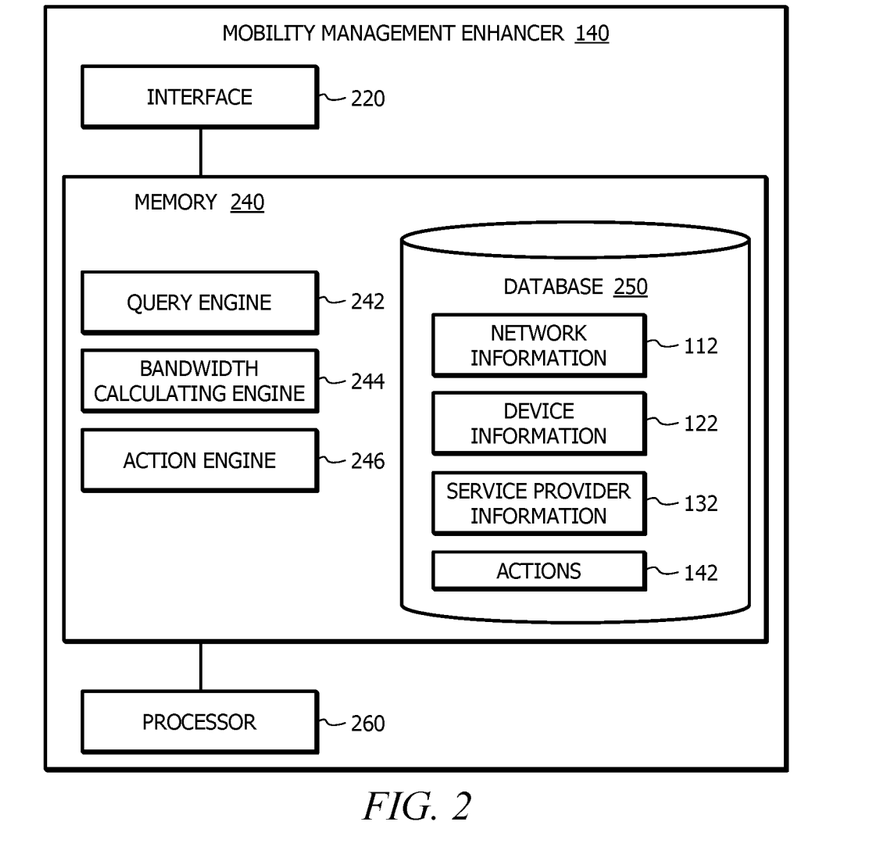
FIG. 2 illustrates an example mobility management enhancer that may be used by the system of FIG. 1.
Figure 3:
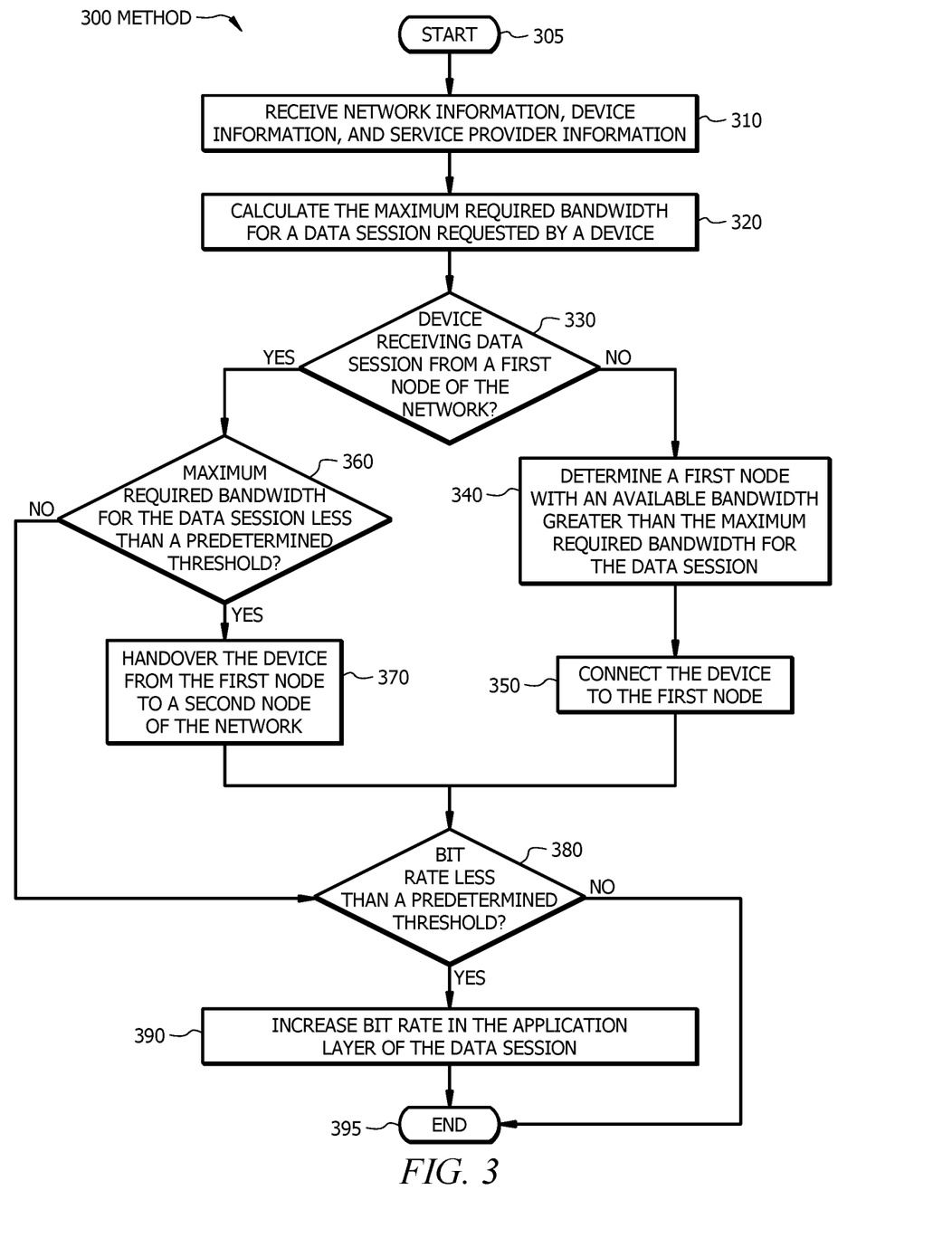
FIG. 3 illustrates an example method for mobility management.
Figure 4:
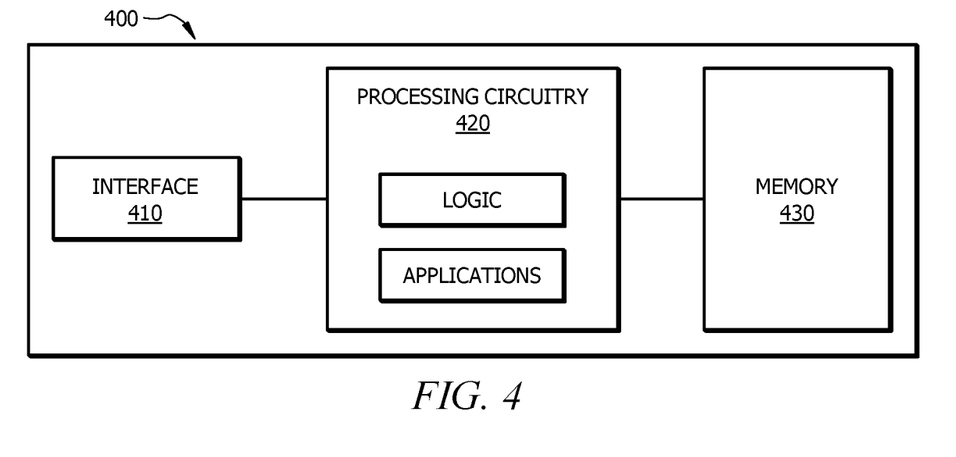
FIG. 4 illustrates an example computer system that may be used by the systems and methods described herein.

FIGS. 1 through 4 show example systems and methods for mobility management. FIG. 1 shows an example system for mobility management, and FIG. 2 shows an example mobility management enhancer that may be used by the system of FIG. 1. FIG. 3 shows an example method for mobility management. FIG. 4 shows an example computer system that may be used by the systems and methods described herein.

FIG. 1 illustrates an example system for mobility management. System 100 of FIG. 1 includes a network 110, a device 120, a service provider 130, and a mobility management enhancer 140. System 100 or portions thereof may be associated with an entity, which may include any entity, such as a business or company that provides mobility management services. The elements of system 100 may be implemented using any suitable combination of hardware, firmware, and software.

Network 110 may be any type of network that facilitates communication between components of system 100. Network 110 may connect device 120, service provider 130, and mobility management enhancer 140 of system 100. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 110 may include one or more access (e.g., mobile access), core, and edge networks (e.g., a 5G core network). A 5G network may include a 5G New Radio (5G NR). Network 110 may include one or more networks.

Network 110 may be any communications network, such as a private network, a public network, a connection through Internet, a mobile network, a WI-FI network, a Bluetooth network, etc. Devices 120 that are WI-FI compatible may connect to the Internet via a wireless local area network (WLAN) and a wireless access point. Network 110 may include an evolved packet data gateway (ePDG). The ePDG of network 110 secures data transmission with device 120. The ePDG may act as a termination node of IPsec tunnels established with device 120.

Network 110 includes network nodes 115. Network nodes 115 are connection points that can receive, create, store, and/or transmit data throughout network 110. Network nodes 115 include a first node, a second node, a third node, and an $n^{th}$ node, where n represents any suitable integer. Network nodes 115 may be located in a single network 110 (e.g., a WI-FI network, a 4G network, or a 5G network) or in multiple networks 110 (e.g., a WI-FI network, a 4G network, and a 5G network, or any other suitable combination). For example, the first node, the second node, the third node, and the $n^{th}$ node of network nodes 115 may all be 4G network nodes. As another example, the first node of network nodes 115 may be a 4G network node, the second node of network nodes 115 may be a 5G network node, the third node of network nodes 115 may be a WI-FI network node, and so on. Network nodes 115 may include one or more E-UTRAN Node Bs (eNBs). The eNBs of network 110 represent hardware connected to network 110 that facilitate direct, wireless communication with device 120. The eNBs may be part of an LTE cellular network.

Network 110 may include Multi-access Edge Computing (MEC) to enable cloud computing capabilities. MEC may provide real-time, high-bandwidth, low-latency access to radio network information. MEC may assist in providing access at the edge of network 110. An MEC application server may be deployed at one or more network nodes 115. Network nodes 115 with MEC capabilities are referred to herein as MEC nodes.

Network nodes 115 may include one or more macro LTE cells (e.g., macro eNBs) and one or more MEC small cells (e.g., MEC source eNBs). The MEC small cells of network 110 may be service-specific. For example, the MEC small cell may be utilized for company breakout when high security is required. The company breakout small cell keeps the company network traffic local without traversing the core network. As another example, the MEC small cell may be utilized for an augmented reality (AR) experience in an experience center or museum that requires low latency. As still another example, the MEC small cell may be utilized for connected cars requiring low latency. As yet another example, the MEC small cell may be utilized for virtual reality (VR) and edge video orchestration that requires low latency and high throughput.

Network nodes 115 may include one or more Serving Gateways (SGWs). The SGWs route and forward data packets through network 110. Network nodes 115 may include and one or more Packet Data Network (PDN) Gateways (PGWs). The PGW provides connectivity from device 120 to external packet data networks by being the point of exit and entry of traffic for device 120. Device 120 may have simultaneous connectivity with more than one PGW. The PGW performs policy enforcement, packet filtering, and packet screening.

One or more components of system 100 may communicate over network 110. For example, mobility management enhancer 140 may communicate over network 110, including receiving information from network 110, device 120, and service provider 130. One or more components of network 110 may include one or more access, core, and edge networks.

Network 110 may communicate network information 112 to mobility management enhancer 140. Network information 112 may include an available capacity of one or more network nodes 115 of network 110. The available capacity of network node 115 may be a limit to the amount of flow network node 115 can receive. Network information 112 may include an available bandwidth of one or more network nodes 115. Network information 112 may include a number of devices 120 connected to each of the network nodes 115. Network information 112 may include real-time and/or historical data. Network information 112 may include a signal strength of the signal between device 120 and a node (e.g., the first node) of network 110. The signal strength may be received by one or more network nodes 115. The signal strength may be represented as a received signal strength indicator (RSSI), which is a measurement of the power present in the received signal. Network 110 may include a network controller such that mobility management enhancer 140 acts as a master controller and the network controller acts as a slave controller.

Although FIG. 1 illustrates a particular arrangement of network 110, device 120, service provider 130, and mobility management enhancer 140, this disclosure contemplates any suitable arrangement of network 110, device 120, service provider 130, and mobility management enhancer 140. Network 110, device 120, service provider 130, and mobility management enhancer 140 may be physically or logically co-located with each other in whole or in part. Although FIG. 1 illustrates a particular number of networks 110, devices 120, service providers 130, and mobility management enhancers 140, this disclosure contemplates any suitable number of networks 110, devices 120, service providers 130, and mobility management enhancers 140. For example, system 100 may include multiple devices 120.

Device 120 of system 100 represents any suitable computing component that may be used to access network 110 to communicate information. Device 120 may include one or more mobile devices, such as a smartphone, a laptop computer, a tablet computer, a camera (e.g., a video camera), wearables, and toys. Device 120 may include one or more non-mobile devices, such as a television, a desktop computer, a webcam, a printer, speakers, a smart appliance, and a smart meter. Device 120 may include one or more sensing devices, such as a motion detector, a smart thermostat, a door lock sensor, a smart light bulb, and a lawn moisture sensor. Device 120 may have wireless network connection capabilities (e.g., WI-FI and/or Bluetooth capabilities). Device 120 may be used to browse websites, stream multimedia (e.g., linear non-interactive multimedia), provide an AR or VR interactive experience, and the like. Device 120 may be used to monitor traffic, environmental conditions, security, and the like. Device 120 may be implemented using any suitable combination of hardware, firmware, and software. For example, device 120 may be implemented using one or more components of the computer system of FIG. 4.

Device 120 may be connected to a single network node 115 (e.g., the first node) of network 110. Device 120 may be connected to multiple network nodes 115 (e.g., the first node, the second node, and the third node, or any suitable combination) of network 110 concurrently. Device 120 may transition from one network node 115 (e.g., the first node) of network 110 to another network node 115 (e.g., the second node) of network 110 as a result of a handover operation.

Device 120 may communicate device information 122 to mobility management enhancer 140. Device information 122 may include registration information. Registration information may include a hardware address (e.g., a MAC address) of device 120 and a type of device 120. Device information 122 may include requirements of device 120 for accessing network 110. The requirements of device 120 may include minimum bandwidth requirements, maximum bandwidth requirements, directional requirements, latency requirements, Quality of Service (QoS) requirements, frequency band capabilities, and the like. Device 120 may communicate the requirements as part of its registration with network 110.

Device information 122 may include an identification of adjacent networks, a current location and/or position, active data streams, and/or current application bandwidth demands. Adjacent networks may be access points or base stations detected by device 120. An adjacent network may be a WI-FI network, a cellular network, a millimeter Wave (MMW) network, or an LTE in unlicensed spectrum (LTE-U) network. Device 120 communicates network measurements about the adjacent networks as network beacons.

Device information 122 may include information associated with a data session. The data session is any temporary and interactive information interchange between device 120 and one or more network nodes 115. The data session may be an audio session, a video session, a file transfer, or a combination thereof. The data session may be a text message or a social media message, a web conference, or a voice telephone call. The data session may involve online gaming, downloading music files, streaming music (e.g., streaming music on a smart phone), streaming television shows, streaming movies, uploading statistics (e.g., uploading statistics for connected and/or autonomous vehicles and/or drones), downloading firmware, and/or updating software. The data session may include information transmitted by a sensor (e.g., a temperature sensor, an acoustic sensor, a speed sensor, a pressure sensor, or a position sensor, or a light sensor). The data session may involve a VR or AR interactive experience. A data session request may be a request to send or receive a data session between device 120 and one or more network nodes 115.

Device information 122 may include an Internet Protocol (IP) address for device 120 and one or more network nodes 115 connected to device 120. Device information 122 may include one or more characteristics of the data session. For example, device information 122 may include latency, jitter, reliability, and packet loss of an active stream of the data session. Latency is the delay in transmitting the data session. Jitter is the variation in latency on a packet flow between two network nodes 115 of network 110. Reliability is the ability of network 110 to communicate the data session to device 120. Packet loss occurs when one or more packets fail to reach their destination. Device information 122 may include real-time and/or historical data. Device 120 may transmit device information 122 to mobility management enhancer 140.

Device 120 may receive instructions (e.g., recommendations) from mobility management enhancer 140 to perform one or more actions. The actions may include adjusting one or more network and/or service level parameters (e.g., a bit rate, a frame rate and/or a resolution). The actions are discussed in more detail in FIG. 2 below.

Service provider 130 of system 100 represents any entity (e.g., an individual, business, or company) that provides mobility management services. Service provider 130 may be a network service provider or an Internet service provider.

Service provider 130 may sell bandwidth or network access to an entity (e.g., a customer). Service provider 130 may be a telecommunications company, a data carrier, a wireless communications provider, or a cable television operator. Service provider 130 may operate in a cloud. The cloud may deliver different services (e.g., servers, storage, and applications) to device 120 through network 110. The cloud may be implemented using any suitable combination of hardware, firmware, and software. For example, the cloud may be implemented using one or more components of the computer system of FIG. 4.

Service provider 130 may communicate service provider information 132 to mobility management enhancer 140. Service provider information 132 may include metadata associated with the data session requested by device 120. The metadata may include multimedia metadata for an active stream. The metadata may include a maximum bit rate, a maximum frame rate, a maximum resolution (e.g., video resolution), and/or connectivity related information (e.g., transport cost for a user's roaming network, transport cost for a user's home network, data rate limitations, and/or network reliability information). The bit rate represents the number of bits per second that the data session can be transmitted within network 110. The frame rate represents the frequency at which the frames in data session are displayed. The resolution represents the number of pixels in each dimension that can be displayed. Service provider information 130 may include real-time and/or historical data. In certain embodiments, service provider 130 may receive service provider information 132 from mobility management enhancer 140.

Service provider information 132 may include application layer requirements. The application layer is an abstraction layer that provides an interface between applications and network 110. The application layer ensures effective communication between applications on network 110. The application layer requirements may be communicated to mobility management enhancer 140 as metadata. The application layer requirements may include latency restraints, jitter restraints, and bandwidth restraints associated with the data session.

Mobility management enhancer 140 of system 100 is a network controller (e.g., a master controller) that manages mobility of network 110. Mobility management enhancer 140 may manage connections between device 120 and network nodes 115. Mobility management enhancer 140 analyzes the state of system 100 and performs actions based on the analysis. Mobility management enhancer 140 may analyze the state of one or more components (e.g., network 110) of system 100. Mobility management enhancer 140 may query the states of one or more components of network 110 (e.g., access, core, and edge networks) periodically, continuously, or on demand.

Mobility management enhancer 140 receives device information 122 from device 120, which may include registration information, device requirements, and information associated with a data session. Mobility management enhancer 140 may determine a data session requested by device 120 based on device information 122. Mobility management enhancer 140 validates and authenticates the data session. Mobility management enhancer 140 may request (see notation 111) network information 112 from one or more network nodes 115 (e.g., a slave network controller) of network 110. Mobility management enhancer 140 may receive network information 112 from one or more network nodes 115 in response to the request. Mobility management enhancer 140 may receive network information 112 from a network operator (e.g., a mobile network operator). Mobility management enhancer 140 may receive service provider information 132 from service provider 130, which may include metadata associated with the data session and application layer requirements.

Mobility management enhancer 140 analyzes the received network information 112, device information 122, and service provider information 132, determines one or more actions 142 based on the analysis, and signals one or more actions 142 to one or more components of system 100 (e.g., network 110). Actions 142 determined by mobility management enhancer 140 may be proactive or corrective. Mobility management enhancer 140 resolves potential contradicting statements (e.g., a non-latency critical application announcement and a latency critical application announcement).

Mobility management enhancer 140 may calculate a maximum required bandwidth for a data session by analyzing service provider information 132. For example, mobility management enhancer 140 may calculate a maximum required bandwidth by combining the frame rate, the bit rate, the resolution, the codec, and/or the available service rates of a given data source (e.g., standard definition, high definition, 4 k video, or High Definition Range (HDR) video.) For example, mobility management enhancer 140 may first determine a current data rate for device 120. The data rate may be signaled actively during service initiation as service template with service rates of the connection. The data rate may be signaled passively through monitoring and analyzing the network traffic. Active signaling may enable service provider 130 to indicate available service rates for content, which may allow network selection based on these application-level requirements.

Mobility management enhancer 140 may compare the maximum required bandwidth to a predetermined threshold. The predetermined threshold may be received from a service provider profile, derived out of the current data connection characteristics, derived out of historical network data, or a combination of the preceding. If the maximum required bandwidth is below the predetermined threshold, the search for an alternative or additional link may be performed. Mobility management enhancer 140 may measure latency, reliability, jitter, and packet loss for the data session.

Mobility management enhancer 140 may determine one or more actions 142 associated with the data session requested or streamed by device 120 based on device information 122, service provider information 132, network information 112, and/or any suitable combination of the preceding. Actions 142 may include initiating a data session by connecting device 120 to network node 115. For example, mobility management enhancer 140 may determine from service provider information 132 that the data session is an AR/VR session with an ultra-low latency requirement. Mobility management enhancer 140 may initiate the data session by connecting device 120 to a first node (e.g., an MEC node) of network 110, which may provide an ultra-low latency connection.

Actions 142 may include transferring the data session from the first node of network nodes 115 to the second node of network nodes 115. For example, mobility management enhancer 140 may determine from service provider information 132 that the data session involves browsing websites, streaming linear non-interactive multimedia, or another non-time sensitive, non-latency critical service. Mobility management enhancer 140 may determine from device information 122 that device 120 is connected to the first node (e.g., an MEC node) of network nodes 115. Mobility management enhancer 140 may instruct a control plane interface of network 110 (e.g., an x2 interface) to handover device 120 from the first node of network nodes 115 to the second node (e.g., a macro node) of network nodes 115, which frees up the first node of network nodes 115 for latency-critical data sessions. As another example, mobility management enhancer 140 may transfer the data session from one type of network (e.g., a 4G network node) to a different type of network (e.g., a 5G network node).

Actions 142 may include connecting device 120 connected to the first node of network nodes 115 to the second node of network nodes 115. For example, mobility management enhancer 140 may determine that device 120 is connected to the first node (e.g., a macro node) of network nodes 115. Mobility management enhancer 140 may determine to additionally connect device 120 to the second node of network nodes 115 within the same network (e.g., a 4G network) as the first node of network nodes 115. Mobility management enhancer 140 may determine to additionally connect device 120 to a different network (e.g., a WI-FI network) than the first node of network nodes 115. Mobility management enhancer 140 may determine to connect device 120 to two or more network nodes 115 to increase bandwidth for the data session or to increase reliability of the data session.

Actions 142 may include adjusting a characteristic of the data session. Mobility management enhancer 140 may adjust (e.g., increase or decrease) a bit rate, a frame rate, and/or a resolution of the data session in the application layer. For example, mobility management enhancer 140 may increase the bit rate of the data session to increase the quality of the data session transmitted to device 120. Mobility management enhancer 140 may adjust a codec of the data session. A codec is a computer program that codes and decodes the data stream. Mobility management enhancer 140 may adjust a buffer. For example, mobility management enhancer 140 may increase the buffer block size.

Mobility management enhancer 140 may determine one or more actions 142 associated with the data session based on one or more policies (e.g., MNO policies). One or more policies may establish priorities for certain types of network information 112, device information 122, and/or service provider information 132. For example, the available capacity of each network node 115, the available bandwidth of each network node 115, and/or the number of devices 120 attached to each network node 115 may be prioritized over a signal strength received by each respective network node 115. As another example, latency restraints, jitter restraints, and/or bandwidth restraints associated with the data session may be prioritized over a signal strength received by each respective network node 115.

Mobility management enhancer 140 may determine to initiate no actions 142 based on a comparison between the current network state the network and/or service requirements. For example, mobility management enhancer 140 may determine that further investigation is required prior to determining to initiate one or more actions 142. Mobility management enhancer 140 may limit the number of actions 142 initiated to reduce the number of mobility related optimizations.

Mobility management enhancer 140 may use one or more machine learning algorithms to manage mobility within network 110. For example, mobility management enhancer 140 may use one or more machine learning algorithms to influence policies. As another example, mobility management enhancer 140 may use one or more machine learning algorithms to collect network information 112, device information 122, and service provider information 132. Mobility management enhancer 140 may be implemented using any suitable combination of hardware, firmware, and software. For example, mobility management enhancer 140 may be implemented using one or more components of the computer system of FIG. 4.

In operation, mobility management enhancer 140 of system 100 receives device information 122 from device 120. Device information 122 includes an IP address for the first node (e.g., an MEC node) of network nodes 115 connected to device 120 and an identification of a data session communicated from the first node of network nodes 115 to device 120. Mobility management enhancer 140 determines from the IP address that device 120 is connected to the first node of network nodes 115. Mobility management enhancer 140 of system 100 receives network information 112 from one or more network nodes 115 of network 110. Network information 112 includes an available bandwidth of the first node of network nodes 115. Mobility management enhancer 140 of system 100 receives service provider information 132 from service provider 130. Service provider information 132 includes metadata for an application layer associated with the data session. Mobility management enhancer 140 determines from the metadata that the data session is a non-latency critical application (e.g., a linear stream of non-interactive multimedia). Mobility management enhancer 140 calculates a maximum required bandwidth for the data session. Mobility management enhancer 140 determines that the maximum required bandwidth for the data session is less than the available bandwidth of the second node of network nodes 115 (e.g., a macro node). Mobility management enhancer 140 determines to handover device 120 from the first node (e.g., the MEC node) to the second node (e.g., the macro node) of network nodes 115, which opens up the availability of the first node (e.g., the MEC node) for another data session with ultra-low latency requirements (e.g., an AR/VR data session).

As such, system 100 of FIG. 1 manages the associations of devices 120 to network nodes 115 based on information received from network 110, device 120, and service provider 130 rather than signal strength alone, which may provide a higher level of throughput with the same amount of spectrum.

FIG. 2 illustrates an example mobility management enhancer 140 that may be used by system 100 of FIG. 1. Mobility management enhancer 140 includes an interface 220, a memory 240, and a processor 260. Interface 220 of mobility management enhancer 140 represents any suitable computer element that can receive information from network 110, transmit information through network 110, perform suitable processing of the information, communicate to other components (e.g., network node 115 of network 110, device 120, and service provider 130) of system 100 of FIG. 1, or any combination of the preceding. Interface 220 may receive network information 112 from network 110, for example. Interface 220 may receive device information 122 from device 120, as another example. Interface 220 may receive service provider information 132 from service provider 130, as still another example. Interface 220 represents any port or connection, real or virtual, including any suitable combination of hardware, firmware, and software, including protocol conversion and data processing capabilities, to communicate through a LAN, a WAN, or other communication system that allows system 100 of FIG. 1 to exchange information between components of system 100.

Interface 220 may be an open application programming interface (API). An open API is a publicly available API. An open API may grant mobility management enhancer 140 programmatic access to a proprietary software application or web service. APIs are requirements that govern the communications between applications. More than one interface may be used to transport data between components of system 100 of FIG. 1.

Memory 240 of mobility management enhancer 140 stores, permanently and/or temporarily, received and transmitted information, as well as system software, control software, other software for mobility management enhancer 140, and a variety of other information. Memory 240 may store information for execution by processor 260. Memory 240 includes any one or a combination of volatile or non-volatile local or remote devices suitable for storing information. Memory 240 may include Random Access Memory (RAM), Read-only Memory (ROM), magnetic storage devices, optical storage devices, or any other suitable information storage device or a combination of these devices. Memory 240 may include any suitable information for use in the operation of mobility management enhancer 140. Additionally, memory 240 may be a component external to (or may be partially external to) mobility management enhancer 140. Memory 240 may be located at any location suitable for memory 240 to communicate with mobility management enhancer 140. Memory 240 may store a query engine 242, a bandwidth calculating engine 244, and an action engine 246.

Query engine 242 of mobility management enhancer 140 requests the states of one or more components of network 110 (e.g., network nodes 115) periodically, continuously, or on demand. In response to querying network 110, mobility management enhancer 140 receives network information 112. Network information 112 may include the available capacity of one or more network nodes 115, an available bandwidth of one or more network nodes 115, a number of devices 120 connected to one or more network nodes 115, a signal strength received by one or more network nodes 115, and the like.

Bandwidth calculating engine 244 of mobility management enhancer 140 is an application that calculates a maximum required bandwidth for a data session. Bandwidth calculating engine 244 may calculate the maximum required bandwidth for the data session by analyzing a frame rate, a bit rate, a resolution, latency, jitter, and/or reliability of the data session. Bandwidth calculating engine 244 may compare the maximum required bandwidth to a predetermined threshold. Bandwidth calculating engine 244 may determine to connect device 120 of FIG. 1 to an alternative network node 115 or an additional network node 115 of FIG. 1 based on comparing the maximum required bandwidth to the predetermined threshold.

Action engine 246 of mobility management enhancer 140 determines one or more actions associated with a data session requested by device 120. The one or more actions may include initiating the data session by connecting device 120 to network node 115 (e.g., an MEC node) of network 110 of FIG. 1, transferring the data session from the first node (e.g., the MEC node) of network nodes 115 to the second node (e.g., a macro node) of network nodes 115, or connecting device 120 connected to the first node (e.g., the MEC node) of network nodes 115 to one or more additional network nodes 115 (e.g., a WI-FI node) of network 110. The one or more actions may include adjusting a codec of the data session, a buffer of the data session, a bit rate of the data session, a frame-rate of the data session, a resolution of the data session, and/or any suitable combination of the preceding.

Memory 240 may store database 250. Database 250 may store certain types of information for network 110 of FIG. 1. For example, database 250 may store network information 112, device information 122, service provider information 132, and actions 142. Database 250 may be any one or a combination of volatile or non-volatile local or remote devices suitable for storing information. Database 250 may include RAM, ROM, magnetic storage devices, optical storage devices, or any other suitable information storage device or a combination of these devices.

Processor 260 of mobility management enhancer 140 controls certain operations of mobility management enhancer 140 by processing information received from interface 220 and memory 240 or otherwise accessed by processor 260. Processor 260 communicatively couples to interface 220 and memory 240. Processor 260 may include any hardware and/or software that operates to control and process information. Processor 260 may be a programmable logic device, a microcontroller, a microprocessor, any suitable processing device, or any suitable combination of the preceding. Additionally, processor 260 may be a component external to mobility management enhancer 140. Processor 260 may be located in any location suitable for processor 260 to communicate with mobility management enhancer 140. Processor 260 of mobility management enhancer 140 controls the operations of query engine 242, bandwidth calculating engine 244, and action engine 246.

Although FIG. 2 illustrates a particular arrangement of interface 220, memory 240, query engine 242, bandwidth calculating engine 244, action engine 246, database 250, and processor 260, this disclosure contemplates any suitable arrangement of interface 220, memory 240, query engine 242, bandwidth calculating engine 244, action engine 246, database 250, and processor 260. Interface 220, memory 240, query engine 242, bandwidth calculating engine 244, action engine 246, database 250, and processor 260 may be physically or logically co-located with each other in whole or in part.

Although FIG. 2 illustrates a particular number of interfaces 220, memories 240, query engines 242, bandwidth calculating engines 244, action engines 246, databases 250, and processors 260, this disclosure contemplates any suitable number of interfaces 220, memories 240, query engines 242, bandwidth calculating engines 244, action engines 246, databases 250, and processors 260. For example, system 100 may include multiple interfaces 220. One or more components of mobility management enhancer 140 may be implemented using one or more components of the computer system of FIG. 4.

FIG. 3 shows an example method for mobility management. Method 300 begins at step 305. At step 310, a mobility management enhancer (e.g., mobility management enhancer 140 of FIGS. 1 and 2) receives network information (e.g., network information 112 of FIG. 2) from a network (e.g., network 110 of FIG. 1), device information (e.g., device information 122 of FIG. 1) from a device (e.g., device 120 of FIG. 1), and service provider information (e.g., service provider information 132 of FIG. 1) from a service provider (e.g., service provider 130 of FIG. 1). Device information 122 includes a request by the device for a data session.

At step 320, the mobility management enhancer calculates a maximum required bandwidth for the data session requested by the device. The mobility management enhancer may calculate the maximum required bandwidth based on the service provider information (e.g., a frame rate of the data session, a bit rate of the data session, a resolution of the data session, and/or any suitable combination of the preceding). At step 330, the mobility management enhancer determines, from the device information, whether the device is connected to a first node (e.g., an MEC node) to stream the data session.

If the mobility management enhancer determines that the device is not connected to a first node, method 300 advances from step 330 to step 340, where the mobility management enhancer determines a first node of the network with an available bandwidth greater than the maximum required bandwidth for the data session. The mobility management enhancer may determine the available bandwidth of several nodes of the network from the network information and select a node with an available bandwidth greater than the maximum required bandwidth for the data session. Method 300 then advances to step 350, where the mobility management enhancer instructs an interface of the network to connect the device to the first node.

If the mobility management enhancer determines that the device is connected to a first node (e.g., an MEC node), method 300 advances from step 330 to step 360, where the mobility management enhancer determines whether the maximum required bandwidth for the data session is less than a predetermined threshold. The predetermined threshold may be an available bandwidth of a second node (e.g., a macro node) of the network. If the mobility management enhancer determines that the maximum required bandwidth for the data session is less than the predetermined threshold, method 300 advances from step 360 to step 370, where the mobility management enhancer hands over the device from the first node to the second node of the network. If the mobility management enhancer determines that the maximum required bandwidth for the data session is greater than or equal to the predetermined threshold, method 300 advances from step 360 to step 380.

Method 300 advances from steps 350 and 370 to step 380, where the mobility management enhancer determines whether a bit rate of the data session is less than a predetermined threshold. The bit rate may be determined from the application layer included in the service provider information. If the mobility management enhancer determines that the bit rate of the data session is less than the predetermined threshold, method 300 advances to step 390, where the mobility management enhancer increases the bit rate in the application layer of the data session, which improves the quality of the data session. Method 300 then moves to step 395, where method 300 ends. If the mobility management enhancer determines that the bit rate of the data session is greater than or equal to the predetermined threshold, method 300 moves from step 380 to step 395, where method 300 ends.

Modifications, additions, or omissions may be made to method 300 depicted in FIG. 3. Method 300 may include more, fewer, or other steps. For example, method 300 may include determining whether a frame rate or resolution of the data session is less than a predetermined threshold. As another example, method 300 may include connecting the device to multiple nodes of the network (e.g., a 4G node and a 5G node). Steps may be performed in parallel or in any suitable order. While discussed as specific components completing the steps of method 300, any suitable component may perform any step of method 300.

FIG. 4 shows an example computer system that may be used by the systems and methods described herein. For example, network 110, device 120, service provider 130, and mobility management enhancer 140 of FIG. 1 may include one or more interface(s) 410, processing circuitry 420, memory(ies) 430, and/or other suitable element(s). Interface 410 (e.g., interface 220 of FIG. 2) receives input, sends output, processes the input and/or output, and/or performs other suitable operation. Interface 410 may comprise hardware and/or software.

Processing circuitry 420 (e.g., processor 260 of FIG. 2) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 240 of FIG. 2) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   receiving, by a mobility management enhancer, device information from a device;
   determining, by the mobility management enhancer, a data session requested by the device based on the device information;
   receiving, by the mobility management enhancer, service provider information from a service provider;
   requesting, by the mobility management enhancer, network information of a network;
   receiving, by the mobility management enhancer, the network information; and
   determining, by the mobility management enhancer, an action associated with the data session requested by the device based on the device information, the service provider information, and the network information.

2. The method of claim 1, wherein:
   the network information comprises one or more of the following:
      a signal strength received by one or more nodes of the network;
      an available capacity of the one or more nodes of the network;
      an available bandwidth of the one or more nodes of the network; and
      a number of devices connected to each of the one or more nodes of the network; and
   determining the action associated with the data session is based on prioritizing one or more of the available capacity, the available bandwidth, and the number of devices over the signal strength.

3. The method of claim 1, wherein the action comprises one of the following:
   initiating the data session by connecting the device to a first node of the network;
   transferring the data session from the first node of the network to a second node of the network; and
   connecting the device connected to the first node of the network to the second node of the network.

4. The method of claim 1, wherein the action comprises at least one of the following:
   adjusting a codec of the data session;
   adjusting a buffer of the data session;
   adjusting a bit rate of the data session;
   adjusting a frame-rate of the data session; and
   adjusting a resolution of the data session.

5. The method of claim 1, further comprising:
   calculating, by the mobility management enhancer, a maximum required bandwidth for the data session by analyzing a frame rate, a bit rate, and a resolution of the data session;
   comparing, by the mobility management enhancer, the maximum required bandwidth to a predetermined threshold; and
   determining, by the mobility management enhancer, to connect the device to a selected one of an alternative node and an additional node of the network based on comparing the maximum required bandwidth to the predetermined threshold.

6. The method of claim 1, wherein the service provider information comprises application layer requirements including metadata and the metadata comprises one or more of the following:
   latency restraints of the data session;
   jitter restraints of the data session; and
   bandwidth restraints associated with the data session.

7. The method of claim 1, wherein the mobility management enhancer communicates with the device, the service provider, and the network using one or more open application programming interfaces (APIs).

8. A system comprising one or more processors and a memory storing instructions that, when executed by the one or more processors, cause the one or more processors to perform operations comprising:
   receiving, by a mobility management enhancer, device information from a device;
   determining, by the mobility management enhancer, a data session requested by the device based on the device information;
   receiving, by the mobility management enhancer, service provider information from a service provider;
   requesting, by the mobility management enhancer, network information of a network;
   receiving, by the mobility management enhancer, the network information; and
   determining, by the mobility management enhancer, an action associated with the data session requested by the device based on the device information, the service provider information, and the network information.

9. The system of claim 8, wherein:
   the network information comprises one or more of the following:
      a signal strength received by one or more nodes of the network;
      an available capacity of the one or more nodes of the network;
      an available bandwidth of the one or more nodes of the network; and
      a number of devices connected to each of the one or more nodes of the network; and
   determining the action associated with the data session is based on prioritizing one or more of the available capacity, the available bandwidth, and the number of devices over the signal strength.

10. The system of claim 8, wherein the action comprises one of the following:
    initiating the data session by connecting the device to a first node of the network;
    transferring the data session from the first node of the network to a second node of the network; and
    connecting the device connected to the first node of the network to the second node of the network.

11. The system of claim 8, wherein the action comprises at least one of the following:
    adjusting a codec of the data session;
    adjusting a buffer of the data session;
    adjusting a bit rate of the data session;
    adjusting a frame-rate of the data session; and adjusting a resolution of the data session.

12. The system of claim 8, the operations further comprising:
   calculating, by the mobility management enhancer, a maximum required bandwidth for the data session by analyzing a frame rate, a bit rate, and a resolution of the data session;
   comparing, by the mobility management enhancer, the maximum required bandwidth to a predetermined threshold; and
   determining, by the mobility management enhancer, to connect the device to a selected one of an alternative node and an additional node of the network based on comparing the maximum required bandwidth to the predetermined threshold.

13. The system of claim 8, wherein the service provider information comprises application layer requirements including metadata and the metadata comprises one or more of the following:
   latency restraints of the data session;
   jitter restraints of the data session; and
   bandwidth restraints associated with the data session.

14. The system of claim 8, wherein the mobility management enhancer communicates with the device, the service provider, and the network using one or more open APIs.

15. One or more non-transitory computer-readable storage media embodying instructions that, when executed by a processor, cause the processor to perform operations comprising:
   receiving, by a mobility management enhancer, device information from a device;
   determining, by the mobility management enhancer, a data session requested by the device based on the device information;
   receiving, by the mobility management enhancer, service provider information from a service provider;
   requesting, by the mobility management enhancer, network information of a network;
   receiving, by the mobility management enhancer, the network information; and
   determining, by the mobility management enhancer, an action associated with the data session requested by the device based on the device information, the service provider information, and the network information.

16. The one or non-transitory more computer-readable storage media of claim 15, wherein:
   the network information comprises one or more of the following:
      a signal strength received by one or more nodes of the network;
      an available capacity of the one or more nodes of the network;
      an available bandwidth of the one or more nodes of the network, and
      a number of devices connected to each of the one or more nodes of the network; and
   determining the action associated with the data session is based on prioritizing one or more of the available capacity, the available bandwidth, and the number of devices over the signal strength.

17. The one or more non-transitory computer-readable storage media of claim 15, wherein the action comprises one of the following:
   initiating the data session by connecting the device to a first node of the network;
   transferring the data session from the first node of the network to a second node of the network; and
   connecting the device connected to the first node of the network to the second node of the network.

18. The one or more non-transitory computer-readable storage media of claim 15, wherein the action comprises at least one of the following:
   adjusting a codec of the data session;
   adjusting a buffer of the data session;
   adjusting a bit rate of the data session;
   adjusting a frame-rate of the data session; and
   adjusting a resolution of the data session.

19. The one or more non-transitory computer-readable storage media of claim 15, the operations further comprising:
   calculating, by the mobility management enhancer, a maximum required bandwidth for the data session by analyzing a frame rate, a bit rate, and a resolution of the data session;
   comparing, by the mobility management enhancer, the maximum required bandwidth to a predetermined threshold; and
   determining, by the mobility management enhancer, to connect the device to a selected one of an alternative node and an additional node of the network based on comparing the maximum required bandwidth to the predetermined threshold.

20. The one or more non-transitory computer-readable storage media of claim 15, wherein the service provider information comprises application layer requirements including metadata and the metadata comprises one or more of the following:
   latency restraints of the data session;
   jitter restraints of the data session; and
   bandwidth restraints associated with the data session.

* * * * *